March 9, 1948.  S. R. GOODMAN, JR  2,437,320
PEDAL ATTACHMENT
Filed Dec. 13, 1945   2 Sheets-Sheet 1

Inventor
SAMUEL R. GOODMAN JR.

By *Clarence A. O'Brien*
and *Harvey B. Jacobson*
Attorneys

March 9, 1948.  S. R. GOODMAN, JR  2,437,320
PEDAL ATTACHMENT
Filed Dec. 13, 1945  2 Sheets-Sheet 2
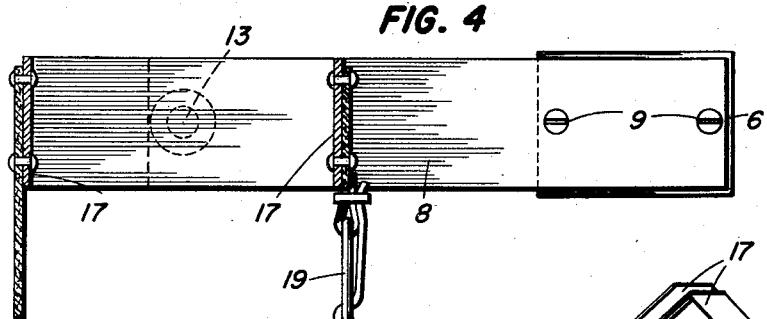
FIG. 4
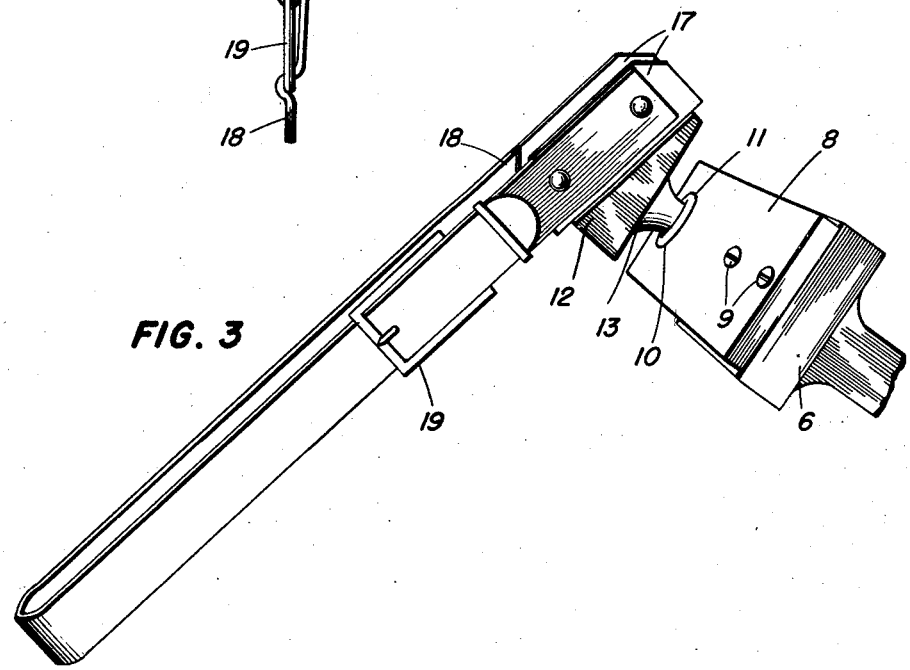
FIG. 3
FIG. 5
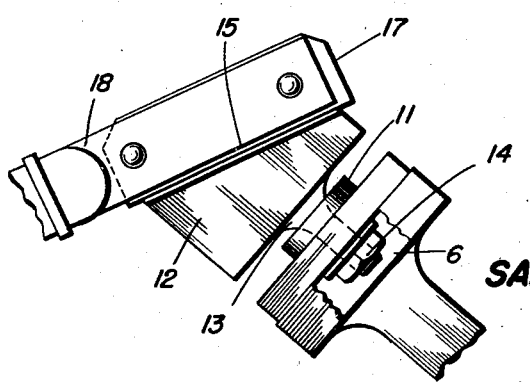
Inventor
SAMUEL R. GOODMAN JR.
By Clarence A. O'Brien
and Harvey B. Jacobson
Attorneys Patented Mar. 9, 1948

2,437,320

UNITED STATES PATENT OFFICE 2,437,320

PEDAL ATTACHMENT

Samuel R. Goodman, Jr., Temple, Tex.

Application December 13, 1945, Serial No. 634,694

1 Claim. (Cl. 74—562)

1

The present invention relates to new and useful improvements in attachments for the pedal of an automobile and more particularly to a device of this character forming an extension for the clutch pedal to facilitate its manipulation by a person handicapped with an artificial or stiff left limb.

It has been found through experience that a person having an artificial left leg has difficulty in effectively and comfortably operating the clutch pedal of an automobile due to the fact that the leg would frequently slip off the clutch pedal; that the leg must be held on the pedal at an angle which makes it comfortable for the driver and frequently the upper portion of the leg rubs against the steering wheel interfering with the free use thereof and also that pressure is usually applied from the ball of the foot back on an artificial limb.

Frequently the pressure point of a limb varies so that by riding the clutch pedal only the toe of the shoe is on the pedal and in cases where the pressure point is past the ball of the foot the driver has difficulty in applying the clutch.

It is accordingly an object of the present invention to provide an extension for the clutch pedal which overcomes the present difficulties explained above and by means of which the clutch pedal may be safely, effectively and comfortably operated by such handicapped persons.

A further object of the invention is to provide an attachment of this character which may be easily secured in position to the clutch pedal of conventional automobiles without necessitating any material changes or alterations in the construction thereof and which at the same time is relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 3 is an enlarged perspective view.

Figure 4 is an enlarged top plan view with the shoe attaching strap broken away and shown in section, and Figure 5 is an enlarged side elevational view of the front end of the attachment.

2

Figure 1:
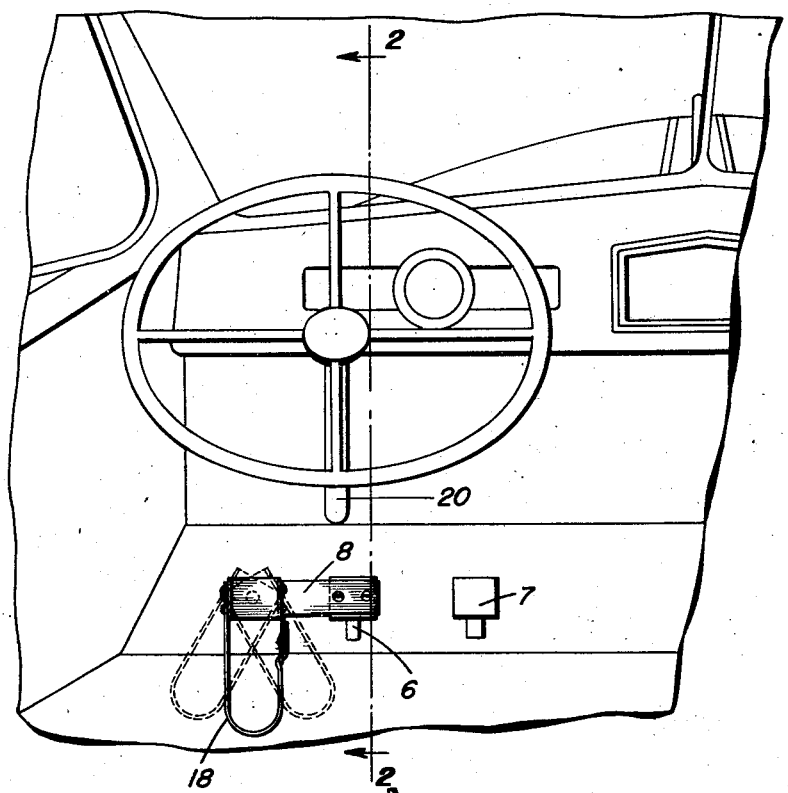
Figure 1 is a top plan view showing the device in position on a clutch pedal.

Referring now to the drawings in detail wherein for the purpose of illustration I have disclosed a preferred embodiment of the invention, the numeral 5 designates the floor board of an automobile provided with the usual clutch and brake pedals 6 and 7, respectively.

A bar 8 has one end secured to the upper surface of the clutch pedal 6 by means of screws or the like 9, the bar extending toward the left of the pedal. The outer end of the bar 8 is formed with an opening 10 in which a bushing 11 is fitted.

A block 12 is formed with a pin 13 on its underside for rotation in the bushing 11, the lower end of the pin being threaded for receiving a nut 14 to secure the pin in the bushing.

The upper surface of the block 12 is inclined in the natural position of the toe portion of a shoe 16 carried by the artificial leg of a person driving the automobile, the side edges of the shoe being engaged between spaced parallel upstanding flanges 17 rising from the sides of the block 12.

Figure 2:
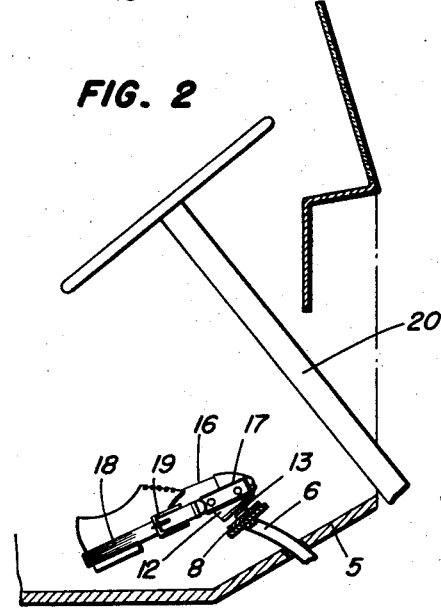
Figure 2 is a sectional view taken substantially on a line 2—2 of Figure 1.

To the outside of each of the flanges 17 is secured the end of a strap 18 having a buckle 19 therein for adjusting the length of the strap, the strap extending along the sides and around the heel of the shoe 16, in the manner as will be apparent from an inspection of Figure 2 of the drawings.

From the foregoing it will be apparent that the left shoe and left leg of the driver is positioned at one side of the clutch pedal 6 and at the left thereof so that the left leg of the driver will be placed out of contact with the steering post 20 to prevent interference with the steering of the vehicle.

The strap 18 secures the shoe of the driver in position on the block 12 to prevent slipping of the foot of the driver from the block while operating the clutch pedal and at the same time the heel of the driver is capable of turning from side to side as indicated by the dotted lines in Figure 1 of the drawings so as not to interfere with the turning of the driver from side to side on the seat of the automobile.

Pressure on the toe of the shoe 16 acting on the block 12 and outer end of the bar 8 will serve to effectively depress the clutch pedal 6 in the usual manner.

In view of the foregoing description taken in conjunction with the accompanying drawings it is believed that a clear understanding of the construction, operation and advantages of the device will be quite apparent to those skilled in this art.

A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What is claimed is:

A vehicle pedal attachment comprising a plate attached to the pedal and extending laterally therefrom, a member pivotally mounted in the outer end of the plate for turning movement about an axis at a right angle to the plane of the plate, upstanding flanges at the sides of said member adapted for engaging the sides of the foot of a person with the toe portion of the foot resting on said member, and a strap carried by the member adapted for extending around the heel of the foot.

SAMUEL R. GOODMAN, Jr.

REFERENCES CITED

The following references are of record in the file of this patent:

UNITED STATES PATENTS

| Number | Name | Date |
|---|---|---|
| 1,050,686 | Felton | Jan. 14, 1913 |
| 1,120,460 | Dunlap et al. | Dec. 8, 1914 |
| 1,146,146 | Fisher | July 13, 1915 |
| 1,358,488 | Woodham | Nov. 9, 1920 |
| 1,516,862 | Loury | Nov. 25, 1924 |
| 1,639,375 | Greenberg | Aug. 16, 1927 |
| 2,152,543 | Feilcke | Mar. 28, 1939 |

FOREIGN PATENTS

| Number | Country | Date |
|---|---|---|
| 239,662 | Great Britain | Sept. 17, 1925 |